E. B. ROCK.
SWEEP RAKE.
APPLICATION FILED AUG. 16, 1910.
1,006,284.
Patented Oct. 17, 1911.
2 SHEETS—SHEET 1.
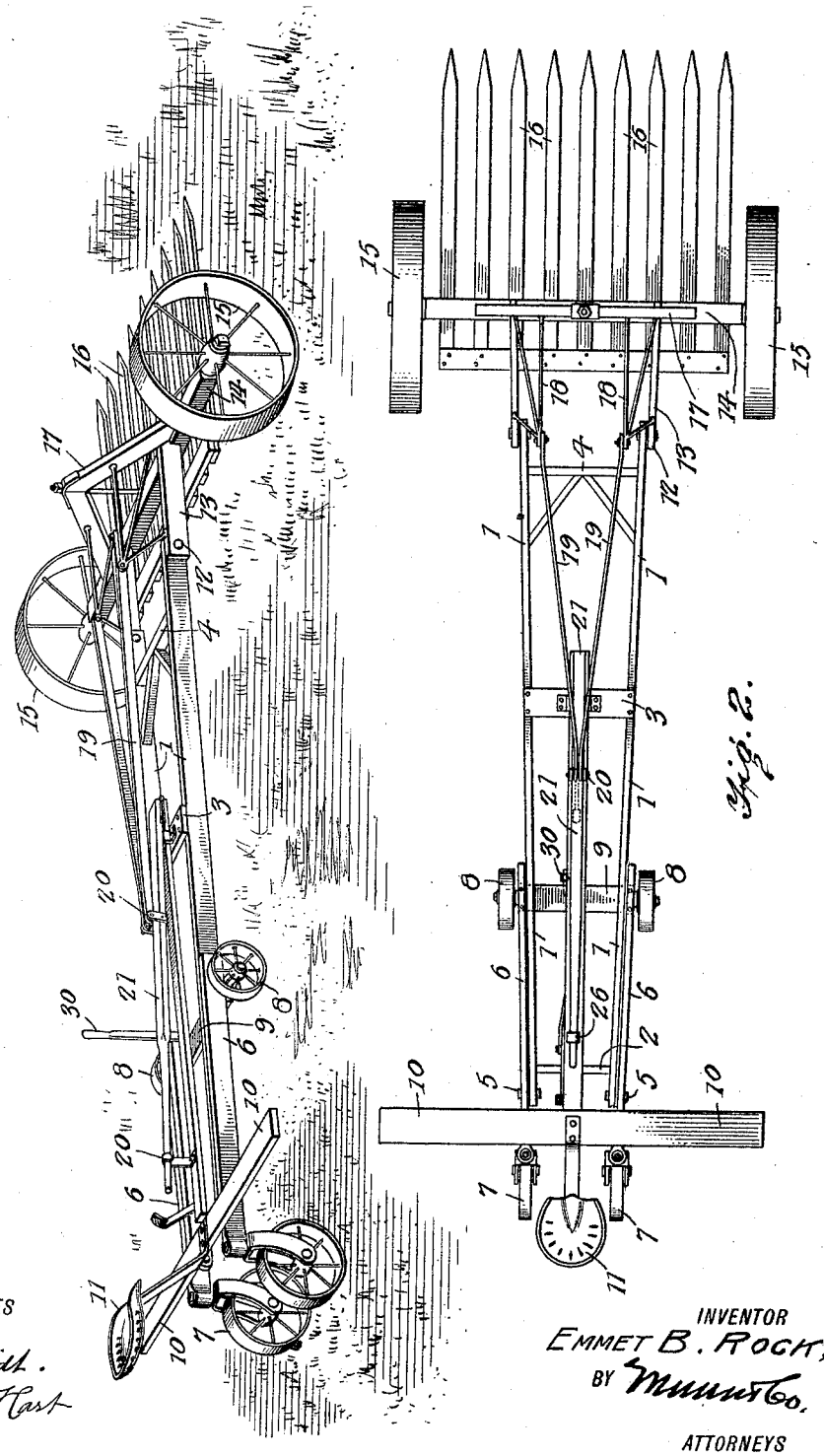
WITNESSES
L. H. Schmidt.
Amos W. Hart
INVENTOR
EMMET B. ROCK,
BY Munn & Co.
ATTORNEYS E. B. ROCK.
SWEEP RAKE.
APPLICATION FILED AUG. 16, 1910.
1,006,284.
Patented Oct. 17, 1911.
2 SHEETS—SHEET 2.
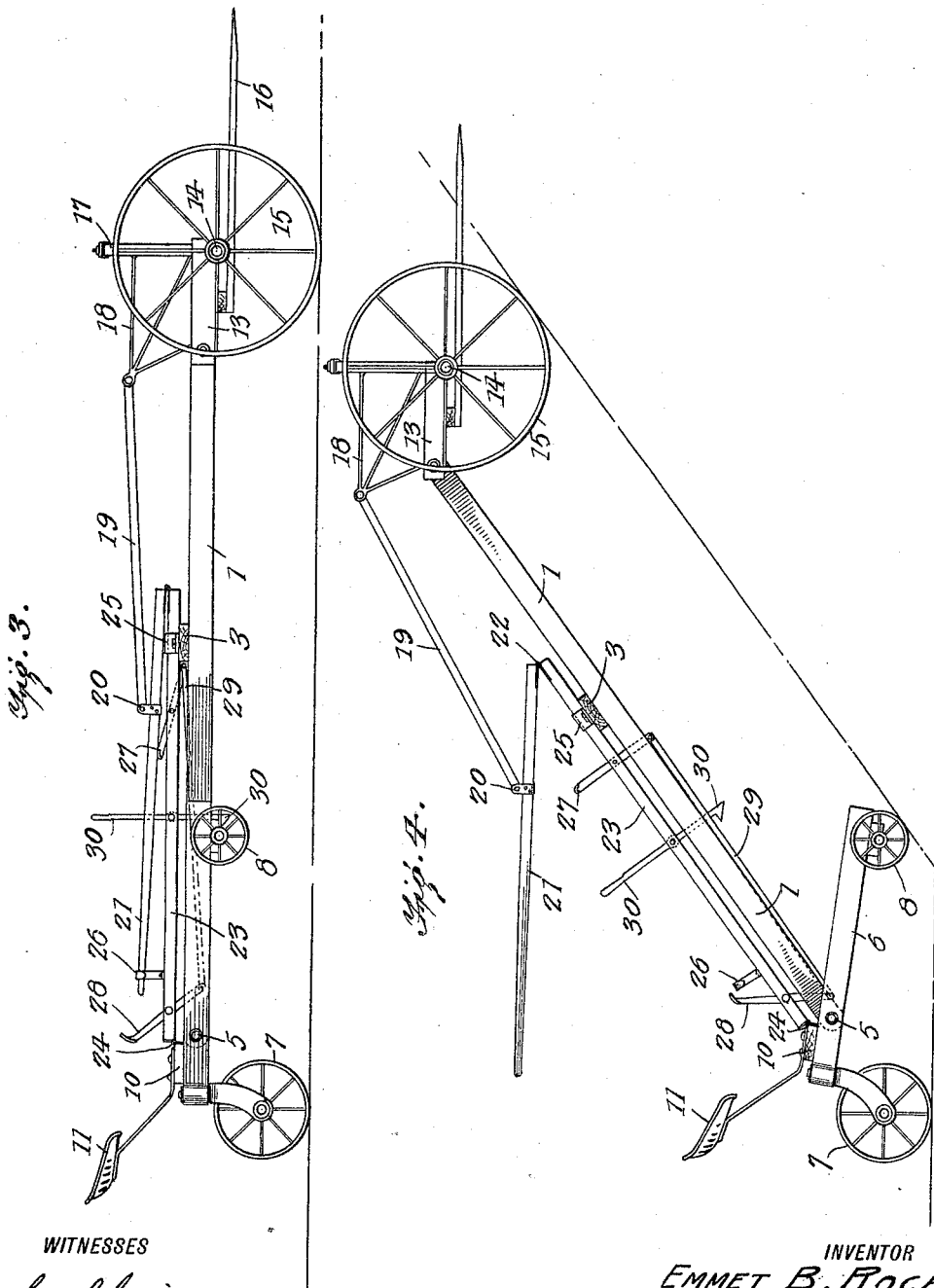
WITNESSES
L. H. Schmidt.
Amos W Hart
INVENTOR
EMMET B. ROCK,
BY Munn & Co.
ATTORNEYS

UNITED STATES PATENT OFFICE.

EMMET BURDETT ROCK, OF GOODLAND, KANSAS.

SWEEP-RAKE.

1,006,284.    Specification of Letters Patent.    Patented Oct. 17, 1911.

Application filed August 16, 1910. Serial No. 577,537.

*To all whom it may concern:*

Be it known that I, EMMET B. ROCK, a citizen of the United States, and a resident of Goodland, in the county of Sherman and State of Kansas, have invented an Improvement in Sweep-Rakes, of which the following is a specification.

My invention relates to an improvement in rakes of that class commonly known as sweep-rakes or drag-rakes and which are provided with long gathering teeth that project in front of a rake-head or axle supported by running wheels.

The improvements are embodied in features of construction, arrangement, and combination of parts hereinafter described and claimed.

In the accompanying drawings, Figure 1 is a perspective view of my improved sweep-rake. Fig. 2 is a plan view of the same. Fig. 3 is a side view showing the parts arranged in the same relation as in Figs. 1 and 2. Fig. 4 is a side view illustrating the operation of the rake.

The body or main frame of the rake is composed of two long bars 1 which are rigidly connected by cross bars 2, 3, and 4. The rear end of this frame is pivoted at 5 to the side bars or frame 6 of a rear truck, the same having caster wheels 7 at the rear and running wheels 8 at the front. The wheels 8 are journaled on a flat axle 9 which rigidly connects the front ends of the truck bars 6. The rear ends of said bars are connected by a long horizontal plank 10 to which a driver's seat 11 is applied.

The forward ends of the main frame bars 1 are pivoted at 12 to arms 13 which are rigidly attached to the front axle 14 on which the large running wheels 15 are journaled. These parts, to wit, 13, 14, and 15, constitute the main portion of what may be termed the front truck. To the under side of the axle 14 are attached long gathering teeth 16, and on the upper side of the axle is secured an angular truss or brace 17, which is arranged at a right angle to the teeth. It will be seen that the front truck, with the teeth 16, rigidly secured thereto is adapted to rock or swing on the pivots 12, so that they may be placed at a downward angle, or held horizontal, or in any other position required for effective operation in taking up and carrying hay. The means for effecting adjustment for this purpose will now be described. The truss 17 and the arms 13 of the axle 14 are connected and braced by a skeleton metal frame 18, and to the rear apexes of the same are pivoted two bars 19 whose rear ends converge and are pivotally connected at 20 to a hand lever 21, whose forward end is in turn pivoted at 22 to a longitudinal bar 23. The latter is hinged at 24 to the rear cross-bar or plank 10, whose front portion is supported on the cross bar 3 and slides in a keeper 25 secured thereto.

When the hand lever 21 is drawn down and secured by a hook 26, as shown in Figs. 1, 2, and 3, the traction on the front truck, effected through the medium of bars 19, is such as to hold the rake-teeth 16 in horizontal position, which position adapts them to support and carry hay. They also occupy this position when the apparatus is being transported, that is to say, either carried or when being hauled from place to place on the running wheels 7 and 15.

For locking the rear truck with its side bars 6 parallel with the side bars 1 of the main frame, I employ a hook 30 which is pivoted to bar 33 and thus adapted to engage the front cross bar 9 of the rear truck. This hook may be operated by the driver from his seat.

When it is desired to lower or incline the rake teeth 16 to take up hay from the ground, the hand lever 21 is released from the catch 26 and pushed upward to the required angle, and this is effected by means of two pivoted levers 27 and 28 and a connecting bar 29. Both levers are pivoted to the bar 23, the front one 27 being arranged directly under the lever 21 and the rear one 28 being located near the driver's seat 11, so that it may serve as a foot lever. Thus, when the driver presses the upper end of the lever 28 forward by applying his foot, the rod 29 raises the front lever 27 so that its free end pushes against the hand-lever 21 and raises it. The weight of the hay may be sufficient to hold the lever 21 raised to even a greater angle than the foot-lever mechanism is capable of effecting, and this is illustrated in Fig. 4, where the sweep-rake is shown in the position the parts may occupy when the sweep-rake is drawn up a hay-stacker having an inclination of say 45°.

It should be noted that the truss or brace 17 applied to the front axle serves as a support or buffer for hay resting on the teeth 16; in other words, it prevents the hay taken up by the teeth from falling or floating backward upon the portion of the frame in rear of the front axle.

What I claim is:—

1. In a sweep-rake of the type indicated, the combination with a front truck having forwardly projecting teeth, a main frame and a rear support for the same, of bars connected with the front axle for rotating it, a hand lever to which said bars are pivoted at their rear ends, and foot-lever mechanism arranged for operation by the driver, the same including a lever arranged under the first-named lever and adapted when duly operated to throw the latter upward and thereby cause downward inclination of the rake teeth, substantially as described.

2. In a sweep-rake of the type indicated, the combination with a front truck provided with teeth and a main frame pivotally connected therewith, of a rear truck which comprises side bars, running wheels and a front axle and is pivotally connected with the main frame, a hook also pivotally connected with an attachment of the main frame and adapted for engagement with the forward end of the rear truck, substantially as described.

EMMET BURDETT ROCK.

Witnesses:
JESSE FREEMONT ROCK,
JOHN MORRIS ROCK.

Copies of this patent may be obtained for five cents each, by addressing the "Commissioner of Patents, Washington, D. C."